US008446700B2

(12) United States Patent
Vanderzon

(10) Patent No.: US 8,446,700 B2
(45) Date of Patent: May 21, 2013

(54) OVERCURRENT PROTECTION IN A DIMMER CIRCUIT

(75) Inventor: James Robert Vanderzon, Adelaide (AU)

(73) Assignee: Clipsal Australia Pty Ltd, Baulkham Hills (AU)

(*) Notice: Subject to any disclaimer, the term of this patent is extended or adjusted under 35 U.S.C. 154(b) by 0 days.

(21) Appl. No.: 12/678,611

(22) PCT Filed: Sep. 19, 2008

(86) PCT No.: PCT/AU2008/001400
§ 371 (c)(1), (2), (4) Date: Jun. 11, 2010

(87) PCT Pub. No.: WO2009/036517
PCT Pub. Date: Mar. 26, 2009

(65) Prior Publication Data

US 2010/0254055 A1 Oct. 7, 2010

(30) Foreign Application Priority Data

Sep. 19, 2007 (AU) ................................ 2007905108
Sep. 19, 2007 (AU) ................................ 2007905109
Sep. 19, 2007 (AU) ................................ 2007905110

(51) Int. Cl.
*H02H 3/08* (2006.01)

(52) U.S. Cl.
USPC ........................................................ 361/93.7

(58) Field of Classification Search .................. 361/93.7
See application file for complete search history.

(56) References Cited

U.S. PATENT DOCUMENTS

| | | | | |
|---|---|---|---|---|
| 4,346,342 | A * | 8/1982 | Carollo | 323/276 |
| 4,896,245 | A * | 1/1990 | Qualich | 361/103 |
| 7,369,386 | B2 * | 5/2008 | Rasmussen et al. | 361/93.9 |
| 2003/0086229 | A1 | 5/2003 | Poe et al. | |
| 2003/0117758 | A1 | 6/2003 | Yoshida | |
| 2005/0185353 | A1 | 8/2005 | Rasmussen et al. | |
| 2005/0237680 | A1 | 10/2005 | Egner | |
| 2006/0268484 | A1 * | 11/2006 | Thurk et al. | 361/93.1 |

FOREIGN PATENT DOCUMENTS

| | | | |
|---|---|---|---|
| DE | 3737327 | C2 | 5/1989 |
| DE | 19630697 | C2 | 2/1998 |
| DE | 19731700 | A1 | 1/1999 |
| DE | 19913224 | C1 | 1/2001 |
| DE | 10208638 | A1 | 9/2003 |

(Continued)

OTHER PUBLICATIONS

PCT International Search Report for PCT/AU2008/001400, Applicant: Clipsal Australia PTY Ltd., et al., Form PCT/ISA/210 and 220, Dated Oct. 31, 2008 (3 pages).

(Continued)

*Primary Examiner* — Ronald W Leja
(74) *Attorney, Agent, or Firm* — Vista IP Law Group LLP

(57) ABSTRACT

Disclosed is an overcurrent protection circuit for use in a dimmer circuit having a switching device for controlling power delivered to a load. The overcurrent protection circuit comprises means for sensing a load current passing through the load and means for comparing the sensed load current with a threshold, wherein the threshold is a dynamic current threshold. Also disclosed is a dimmer circuit comprising the overcurrent protection circuit.

23 Claims, 4 Drawing Sheets

FOREIGN PATENT DOCUMENTS

| | | | |
|---|---|---|---|
| EP | 0327881 | A1 | 8/1989 |
| GB | 2217123 | A | 10/1989 |
| JP | 2000133488 | A | 5/2000 |
| WO | WO 03/081364 | A1 | 10/2003 |
| WO | WO 03/081961 | A1 | 10/2003 |
| WO | WO 03/081962 | A1 | 10/2003 |
| WO | WO 2007/068040 | A1 | 6/2007 |
| WO | WO 2007/068041 | A1 | 6/2007 |
| WO | WO 2007/068042 | A1 | 6/2007 |

OTHER PUBLICATIONS

PCT Written Opinion of the International Search Authority for PCT/AU2008/001400, Applicant: Clipsal Australia PTY Ltd., et al., Form PCT/ISA/237, dated Oct. 31, 2008 (4 pages).

PCT International Preliminary Report on Patentability (Chapter I of the Patent Cooperation Treaty) for PCT/AU2008/01400, Applicant: Clipsal Australia PTY Ltd., et al., Form PCT/IB/326 and 373, dated Aug. 8, 2009 (12 pages).

* cited by examiner $$V_A = \frac{R_2}{R_1+R_2} \cdot V_{LL} + V_{RS1}$$

Normal Conditions

Short Circuit Conditions

OVERCURRENT PROTECTION IN A DIMMER CIRCUIT

TECHNICAL FIELD

The present invention relates to dimmer circuits and in particular, to detecting overcurrent conditions.

This Application is a U.S. National Stage filing under 35 U.S.C. §371 of International Application No. PCT/AU2008/001400, filed 19 Sep. 2008, which claims priority of Australian Provisional Patent Application No. 2007905110, filed on 19 Sep. 2007, Australian Provisional Patent Application No. 2007905108, filed on 19 Sep. 2007 and Australian Provisional Patent Application No. 2007905109, filed on 19 Sep. 2007, The contents of the aforementioned applications are incorporated by reference as if set forth fully herein. Priority to the aforementioned application is hereby expressly claimed in accordance with 35 U.S.C. §§119, 120, 365 and 371 and any other applicable statutes.

The entire content of each of these applications is hereby incorporated by reference.

INCORPORATION BY REFERENCE

The following documents are referred to in the following description:

PCT/AU03/00365 entitled "Improved Dimmer Circuit Arrangement"; PCT/AU03/00366 entitled "Dimmer Circuit with Improved Inductive Load";

PCT/AU03/00364 entitled "Dimmer Circuit with Improved Ripple Control";

PCT/AU2006/001883 entitled "Current Zero Crossing Detector in A Dimmer Circuit";

PCT/AU2006/001882 entitled "Load Detector For A Dimmer"; and

PCT/AU2006/001881 entitled "A Universal Dimmer"

Co-pending Australian Provisional Patent Application entitled "Dimmer Circuit With Overcurrent Detection".

The entire content of each of these applications is hereby incorporated by reference.

BACKGROUND

Dimmer circuits are used to control the power provided to a load such as a light or electric motor from a power source such as mains power. Such circuits often use a technique referred to as phase controlled dimming. This allows power provided to the load to be controlled by varying the amount of time that a switch connecting the load to the power source is conducting during a given cycle.

For example, if voltage provided by the power source can be represented by a sine wave, then maximum power is provided to the load if the switch connecting the load to the power source is on at all times. In this way the, the total energy of the power source is transferred to the load. If the switch is turned off for a portion of each cycle (both positive and negative), then a proportional amount of the sine wave is effectively isolated from the load, thus reducing the average energy provided to the load. For example, if the switch is turned on and off half way through each cycle, then only half of the power will be transferred to the load. The overall effect will be, for example in the case of a light, a smooth dimming action resulting in the control of the luminosity of the light.

Modern dimming circuits generally operate in one of two ways—leading edge or trailing edge. In leading edge technology, the dimmer circuit "chops out" or blocks conduction of electricity by the load in the front part of each half cycle (hence the term "leading edge"). In trailing edge technology, the dimmer circuit "chops out "or blocks conduction of electricity by the load in the back part of each half cycle.

Since the load is connected to a high voltage or current source such as mains power, a defect in the circuit such as a short circuit, can lead to a sudden surge of high current, which can damage the load and any circuitry connected to the load. It is useful for the dimmer circuit to be able to detect the presence of such high, or overcurrent conditions, and act so as to remove the load and/or connected circuitry from the high current source.

The decision to act so as to remove the load and/or connected circuitry may be based upon the sensed current exceeding a preset threshold. A number of methods exist which provide a means and method of comparing the sensed current with a preset threshold.

In one method, the criteria for cutout is determined by the instantaneous current flowing through the dimmer exceeding a pre-determined threshold level, particularly for the condition when a power device is commencing conduction using controlled transition time while the instantaneous line voltage is high, in that the instantaneous power dissipation imposed upon the power device while a short-circuit load condition exists, is high.

In another existing method, the criteria for cutout is determined by the product of the instantaneous voltage appearing across the dimmer and the instantaneous current flowing through the dimmer exceeding a pre-determined threshold level i.e. instantaneous power level in the power semiconductor, however, such circuit designs are complex and expensive to design and manufacture.

SUMMARY

An overcurrent protection circuit for use in a dimmer circuit comprising a switching device for controlling power delivered to a load, the overcurrent protection circuit comprising:

- means for sensing a load current passing through the load; and
- means for comparing the sensed load current with a threshold; wherein the threshold is a dynamic current threshold.

An overcurrent protection circuit wherein the switching device comprises a first switch and a second switch.

In one form, the dynamic current threshold is inversely proportional to the voltage appearing across the switching device.

In one form, the overcurrent protection circuit generates a cut out signal when the sum of the instantaneous voltage appearing across the dimmer and the instantaneous current flowing through the dimmer exceeds the threshold.

In one form, the overcurrent protection circuit further comprises a trip signal generator to generate a trip signal for disconnecting gate drive signals from the first and second switches.

In one form, the trip signal is applied to a latch circuit for disconnecting the gate drive signals from the controlling first and/or second switch.

In one form, the means for sensing the load current passing through the load comprises a current sense resistor RS1 connected between the current path between the first and second switches.

In one form the first and second switches are MOSFETs and the current sense resistor is connected between a source of the first switch and the source of the second switch.

In another form, the first and second switches are IGBTs and the current sense resistor is connected between a collector of the first switch and the collector of the second switch.

In one form, the dynamic current threshold $I_T$ is determined by:

$$I_T=[V_{ref}-R2\cdot V_{LL}/(R1+R2)]/RS1$$

Where:

$V_{LL}$=Line voltage−Load voltage

R1=Voltage sense resistor

R2=voltage converter resistor

RS1=Current sense resistance $V_{ref}$=reference voltage

According to another aspect of the present invention, there is provided a method for providing overcurrent protection in a dimmer circuit comprising a switching device for controlling power delivered to a load, the method comprising:

sensing a load current passing through the load; and comparing the sensed load current with a threshold;

wherein the threshold is a dynamic current threshold.

In one form, the method further comprises generating a trip signal when the sensed load current exceeds the threshold, to isolate the load from the power.

In one form, the method further comprises calculating the threshold $I_T$ according to the following relation:

$$I_T=[V_{ref}-R2\cdot V_{LL}/(R1+R2)]/RS1$$

Where:

$V_{LL}$=Line voltage−Load voltage

R1=Voltage sense resistor

R2=voltage converter resistor

RS1=Current sense resistance $V_{ref}$=reference voltage

According to another aspect of the present invention, there is provided a dimmer circuit comprising the overcurrent protection circuit of the first aspect.

BRIEF DESCRIPTION OF THE DRAWINGS

Various aspects of the present invention will now be described in detail with reference to the following figures in which:

FIGS. 2A to 21—show waveforms at various points in the circuit arrangement of FIG. 1 during normal and short-circuit/overcurrent conditions;

FIG. 3—shows the variation of trip current $I_T$ with Line-Load voltage $V_{LL}$ resulting from the present invention; and FIG. 4—shows a graph showing the short-circuit instantaneous power vs line voltage comparing the present invention with the prior art.

DETAILED DESCRIPTION

A short-circuit protective cutout mechanism for the power semiconductors within a phase-control dimmer, whereby the criteria for cutout is determined by the sum of the instantaneous voltage appearing across the dimmer and the instantaneous current flowing through the dimmer exceeding a predetermined threshold level.

Figure 1:
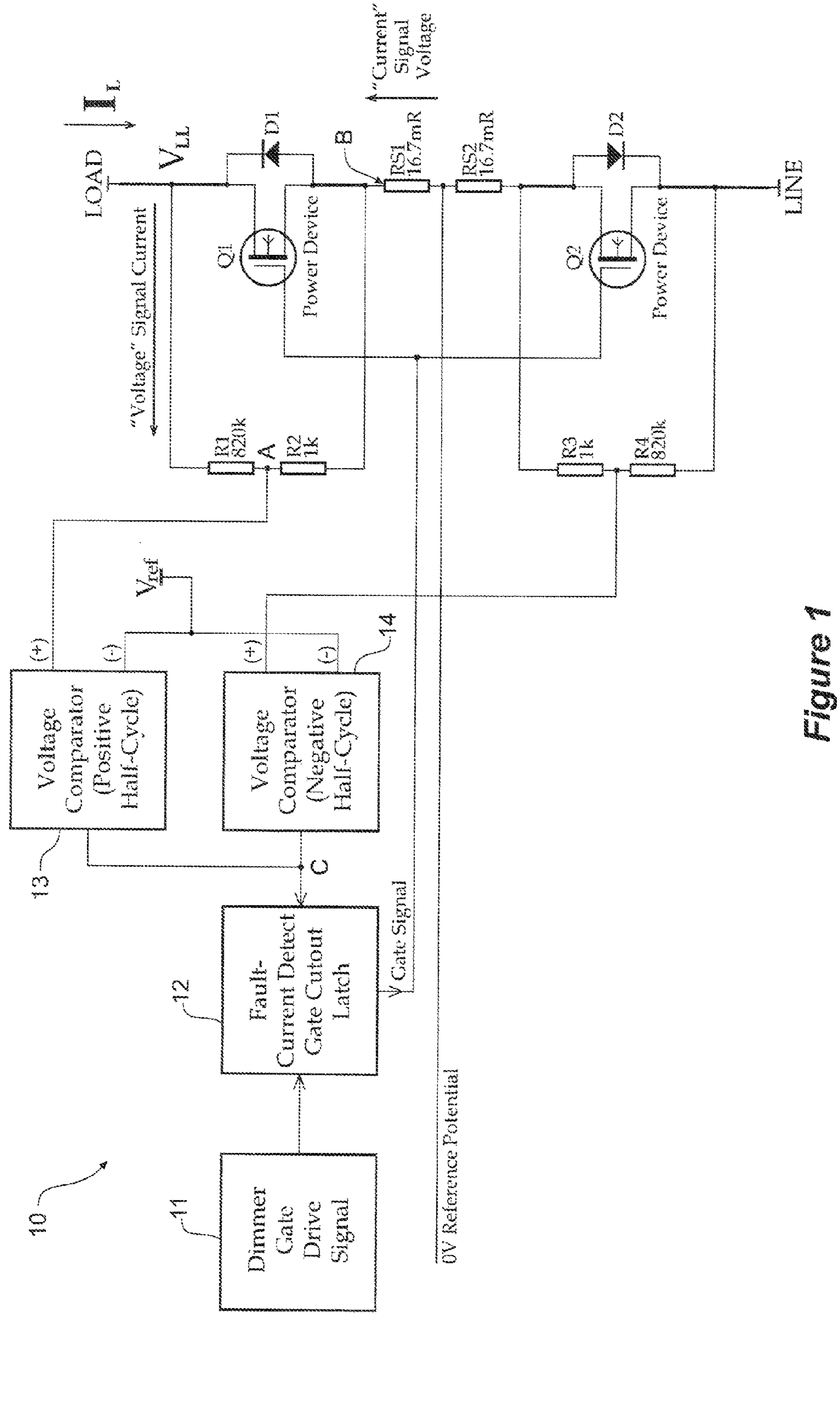
FIG. 1—shows a circuit arrangement according to one aspect of the present invention, using dynamic current sensing.

FIG. 1 shows a dimmer circuit 10 controlling power delivered to the load as shown in FIG. 1. Dimmer 10 has a switching device, in this example provided by first and second switches MOSFETs Q1 and Q2 (for example SPA20N60C3). The switches turn on and off in response to dimmer gate drive signals provided by block 11 as will be understood by the person skilled in the art. The switch elements Q1 and Q2 operate/control the load alternately, each operating at different polarities during subsequent half-cycles of the power applied by the line. Each switch element has an associated respective anti-parallel diode D1 and D2.

It will be understood that the various aspects of the present invention may be applied to any form of dimmer circuit, such as those described in PCT/AU03/00365 entitled "Improved Dimmer Circuit Arrangement"; PCT/AU03/00366 entitled "Dimmer Circuit with Improved Inductive Load";

PCT/AU03/00364 entitled "Dimmer Circuit with Improved Ripple Control";

PCT/AU2006/001883 entitled "Current Zero Crossing Detector in A Dimmer Circuit";

PCT/AU2006/001882 entitled "Load Detector For A Dimmer"; and

PCT/AU2006/001881 entitled "A Universal Dimmer", the entire content of each of which is hereby incorporated by reference.

Figure 2A:
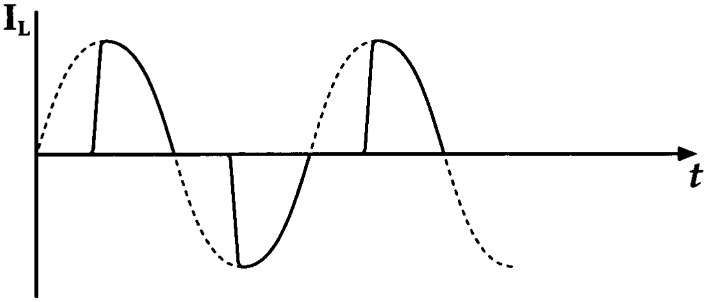
Figure 2B:
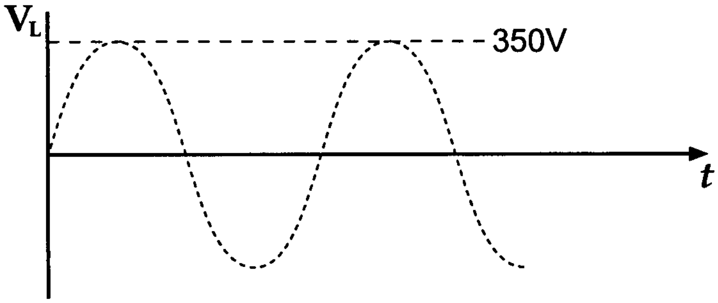
Figures 1, 2C:
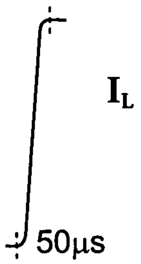
Figures 2, 2C:
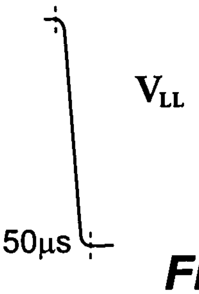

The present example illustrates the operation of the circuit as switch Q1 turns on. FIG. 2A shows the substantially-sinusoidal portion of the line current $I_L$, with the turn-on of switch Q1 and Q2 (second half-cycle), whether by alternate or simultaneous gate activation. The corresponding line voltage $V_L$ is shown in FIG. 2B, with a peak value of 350V. At the scale shown in FIG. 2A, the turn-on appears to be a step function, however, as will be appreciated by the person skilled in the art, there is a transition from non-conduction to full conduction, as shown in FIG. 2C. In this example, the transition time from 0V to 350V is about 50 μS. FIG. 2C-1 shows the transition of load current IL and FIG. 2C-2 shows the corresponding transition of dimmer voltage VLL.

Referring back to FIG. 1, the instantaneous voltage appearing across the load controlling power device (Q1) is represented as a signal current flowing through the shunt voltage sense resistor R1. This "Voltage" signal current is converted to a corresponding "Voltage" signal voltage by resistor R2—in series with the shunt voltage sense resistor R1. R2 has small value compared to R1, and hence does not significantly influence the signal current.

The instantaneous current flowing through switch Q1 is represented as a signal voltage across the series current sense resistor RS1. The series resistor circuit arrangement of R1, R2 & RS1 results in addition of the "Voltage" signal voltage and the "Current" signal voltage to form a composite signal voltage at the junction of R1 and R2 relative to 0V reference potential.

The magnitude of the composite signal voltage is compared to a reference voltage Vref and when greater, will activate the fault current cutout latch.

It will be understood that various other means of sensing the current flowing through the load may be used, including the method as described in a co-pending PCT Patent Application entitled "Dimmer Circuit With Overcurrent Detection", claiming priority from Australian Provisional Patent Application No. 2007905108 also entitled "Dimmer Circuit With Overcurrent Detection", the entire content of which is hereby incorporated by reference.

Referring again to FIG. 2, FIGS. 2D to 2I show various waveforms at different points in the circuit of FIG. 1, during the transition time of about 50 μS as shown in FIG. 2C described above.

Figure 2D:
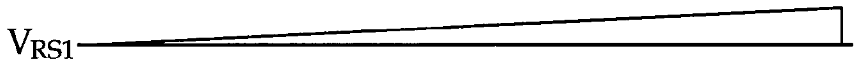

In FIG. 2D, it can be seen that VRS1 increases as a constant ramp up to IRS1×RS1, where IRS1 is the corresponding instantaneous load current under normal load conditions.

Figure 2E:
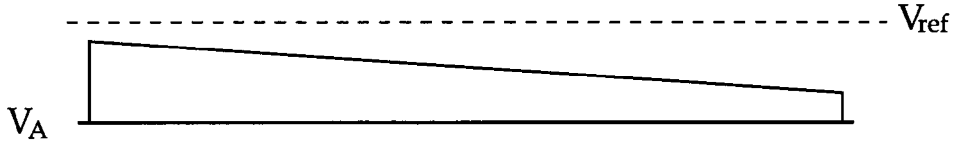

In FIG. 2E, it can be seen that as $V_{LL}$ drops from 350V, the voltage at point A in FIG. 1 ($V_A$) decreases as a continuous ramp function, from a value determined by VLL×R2/(R1+R2) to a small offset determined by IRS1×RS1.

Figure 2F:
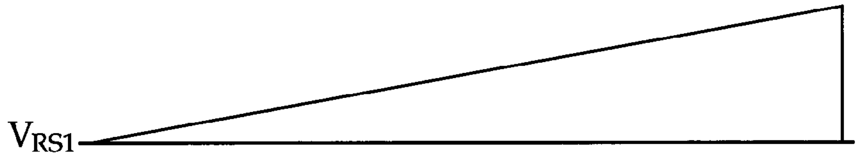

Under short circuit conditions, in FIG. 2F, it is seen that $V_{RS1}$ across current sense resistor RS1 also increases as a constant ramp function towards a substantially greater level than under normal conditions (FIG. 2D).

Figure 2G:

FIG. 2G shows the value of VLL×R2/(R1+R2), which under short circuit conditions, remains a constant.

Figure 2H:
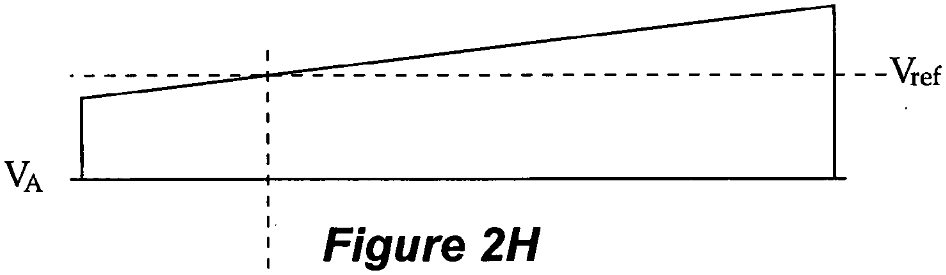

FIG. 2H shows the value of VA under short circuit conditions. The actual value of VA=[(VLL−2VRS1)(R2/(R1+R2)]+VRS1 but under short circuit conditions, the value of VRS1 is very small compared to the value of VLL and so it can reasonably be approximated that VA=VLL×(R2/R1+R2)+VRS1. Thus FIG. 2H shows the value of VA as the sum of FIGS. 2G and 2F.

FIG. 2H also shows the value of Vref, which crosses the function for VA. The constant reference voltage $V_{ref}$ set in this example at a constant 0.5 volts.

Figure 2I:
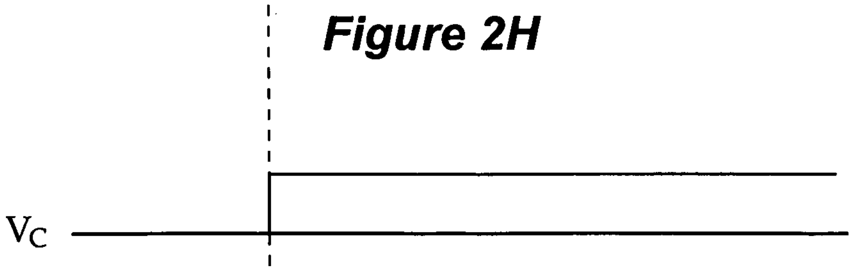

It can be seen that at some point, VA crosses the value of Vref. FIG. 2I shows that at this crossover point, the voltage VC at point C in FIG. 1, jumps to the level of Vref, providing the trigger signal to latch circuit 12 (FIG. 1), to disconnect the switches Q1 and Q2 from Dimmer Gate Drive Signal block 11.

The Trip Current or dynamic current threshold, $I_T$ can be calculates as:

$$I_T=[V_{ref}-R2\cdot V_{LL}/(R1+R2)]/RS1$$

Figure 3:
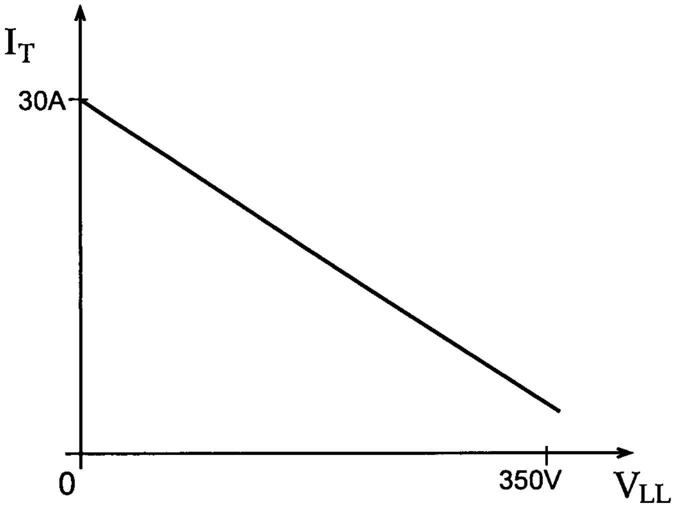

Where:

$V_{LL}$=Line voltage−Load voltage
R1=Voltage sense resistor
R2=voltage converter resistor
RS1=Current sense resistance
$V_{ref}$=reference voltage FIG. 3 shows a plot of $I_T$ as it varies with $V_{LL}$ ranging from 0V to 350V, with the values of the components as shown in FIG. 1, and $V_{ref}$ equal to about 0.5V. FIG. 3 shows that the higher the line-voltage to load voltage, the lower the trip current is. This reduces the excessive power dissipation problems associated with prior methods where the trip current is static.

Figure 4:
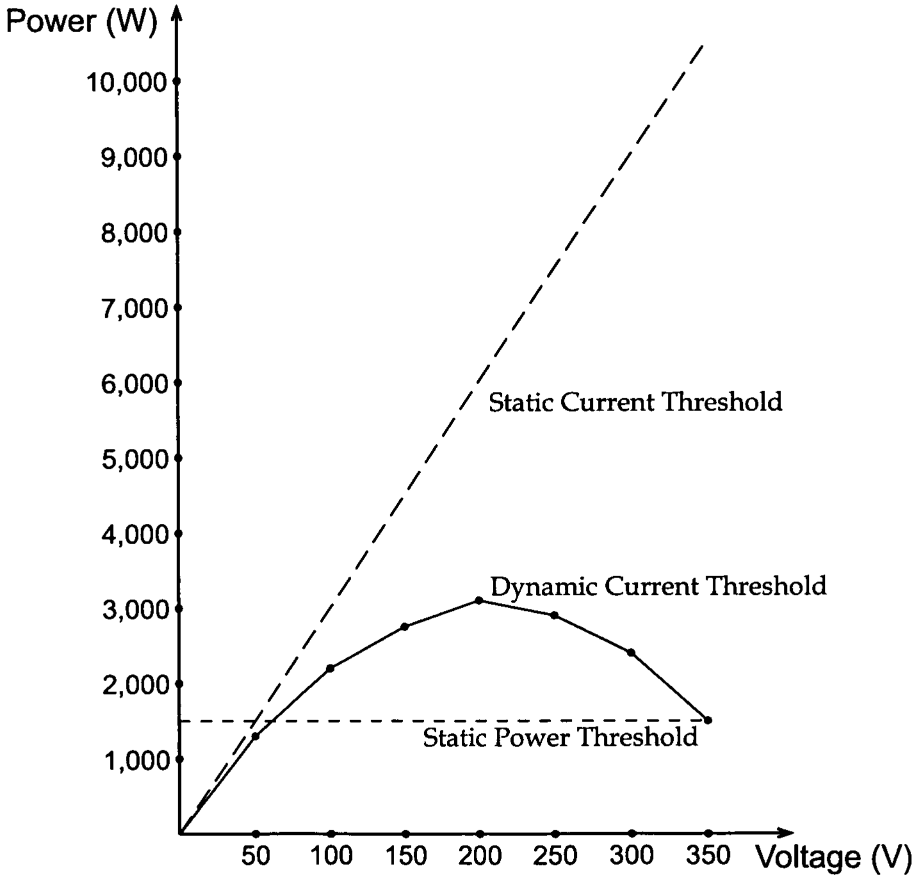

FIG. 4 shows a plot of Power (W) vs Line Voltage-Load Voltage $V_{LL}$ for prior art methods using static current sensing and static power sensing as well as for the "dynamic current" sensing of the present invention. It can be seen that the power dissipated by the switching device before cutting out at a high line voltage is greatly reduced as compared to the static current method, and equal to that of the static power method. The complexity of the circuit design of the present invention is also far less than that required for the static power method.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications in its scope.

For example, in one particular application, it is possible to remove gate drive from one only of the first and/or second switches (whichever is controlling at the time), and allow the other switch to continue conducting every half cycle It is also possible to apply the protection circuit of the present invention to a DC application, in which the switching device comprises only one switch.

The invention is equally applicable to other types of switching elements, including bi-polar transistors. Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The invention claimed is:

1. An overcurrent protection circuit for use in a dimmer circuit comprising a switching device for controlling power delivered to a load, the overcurrent protection circuit comprising:
   - a first sensor for sensing a load current passing through the load;
   - a second sensor for sensing a voltage across the switching device; and
   - an overcurrent detector for detecting an overcurrent condition, wherein the overcurrent detector is configured to sum a signal representative of the sensed load current passing through the load and a signal representative of the sensed voltage across the switching device to obtain a composite signal, and to compare the composite signal with a threshold to detect the overcurrent condition.

2. An overcurrent protection circuit as claimed in claim 1 wherein the switching device comprises a first switch and a second switch.

3. An overcurrent protection circuit as claimed in claim 2 further comprising a trip signal generator to generate a trip signal for disconnecting gate drive signals from the first and second switches.

4. An overcurrent protection circuit as claimed in claim 3 wherein the trip signal is applied to a latch circuit for disconnecting the gate drive signals from the first and second switches.

5. An overcurrent protection circuit as claimed in claim 2 wherein the first sensor comprises a current sensor resistor RS1 connected between the first and second switches and the second sensor comprises a voltage sense resistor R1 connected between a first terminal of the first switch and a first input of a comparator and a voltage converter resistor R2 connected between a second terminal of the first switch and the first input of a comparator.

6. An overcurrent protection circuit as claimed in claim 5 wherein the first and second switches are MOSFETs and the first terminal of the first switch is a drain terminal and the second terminal of the first switch is a source terminal and the current sense resistor RS1 is connected between the source terminal of the first switch and a source terminal of the second switch.

7. An overcurrent protection circuit as claimed in claim 5 wherein the first and second switches are IGBTs and the first terminal of the first switch is a collector terminal and the second terminal of the first switch is an emitter terminal and the current sense resistor RS1 is connected between a collector terminal of the first switch and a collector terminal of the second switch.

8. An overcurrent protection circuit as claimed in claim 5 wherein the first sensor comprises a current sensor resistor RS1 connected between the first and second switches and the-overcurrent condition is detected when the load current $I_T$ passing through the current sense resistor exceeds:

$$[V_{ref}-R2\cdot V_{LL}/(R1+R2)]/RS1$$

Where:
$V_{LL}$=Line voltage−Load voltage
R1=Voltage sense resistor resistance
R2=Voltage converter resistor resistance
RS1=Current sense resistor resistance
$V_{ref}$=reference voltage.

9. An overcurrent protection circuit as claimed in claim 1 wherein the current of the composite signal is inversely proportional to the voltage appearing across the switching device.

10. An overcurrent protection circuit as claimed in claim 9 wherein the first sensor comprises a current sense resistor in series with the dimmer circuit and generates a first instantaneous voltage signal representing the instantaneous current flowing through the current sense resistor, and the second sensor generates a second instantaneous voltage signal representing the instantaneous voltage appearing across the switching device, and the composite signal comprises the sum of the first instantaneous voltage and the second instantaneous voltage and the overcurrent protection circuit generates a cut out signal when the composite signal exceeds a reference voltage.

11. An overcurrent protection circuit as claimed in claim 10 further comprising a comparator for comparing the reference voltage Vref and the composite signal VA, wherein the composite signal VA is determined according to the relation:

$$VA=R2\cdot V_{LL}/(R1+R2)+VRS1$$

Where:
$V_{LL}$=Line voltage−Load voltage
R1=Voltage sense resistor resistance
R2=Voltage converter resistor resistance
VRS1=Current sense resistor voltage.

12. An overcurrent protection circuit as claimed in claim 1 wherein the first sensor comprises a current sense resistor in series with the dimmer circuit and generates a first instantaneous voltage signal representing the instantaneous current flowing through the current sense resistor, and the second sensor generates a second instantaneous voltage signal representing the instantaneous voltage appearing across the switching device, and the composite signal comprises the sum of the first instantaneous voltage and the second instantaneous voltage and the overcurrent protection circuit generates a cut out signal when the composite signal exceeds a reference voltage.

13. An overcurrent protection circuit as claimed in claim 12 wherein the second sensor comprises a voltage sense resistor R1 and a voltage converter resistor R2 and when the overcurrent condition is detected the instantaneous current flowing through the current sense resistor $I_T$ exceeds:

$$[V_{ref}-R2\cdot V_{LL}/(R1+R2)]/RS1$$

Where:
$V_{LL}$=Line voltage−Load voltage
R1=Voltage sense resistor resistance
R2=Voltage converter resistor resistance
RS1=Current sense resistor resistance
$V_{ref}$=reference voltage.

14. An overcurrent protection circuit as claimed in claim 12 further comprising a comparator for comparing the reference voltage Vref and the composite signal VA, wherein the composite signal VA is determined according to the relation:

$$VA=R2\cdot V_{LL}/(R1+R2)+VRS1$$

Where:
$V_{LL}$=Line voltage−Load voltage
R1=Voltage sense resistor resistance
R2=Voltage converter resistor resistance
VRS1=Current sense resistor voltage.

15. A dimmer circuit comprising the overcurrent protection circuit of claim 1.

16. A method for providing overcurrent protection in a dimmer circuit comprising a switching device for controlling power delivered to a load, the method comprising:
sensing a load current passing through the load;
sensing a voltage across the switching device;
summing a signal representative of the sensed load current passing through the load and a signal representative of the sensed voltage across the switching device to obtain a composite signal; and
comparing the composite signal with a threshold to detect an overcurrent condition.

17. A method for providing overcurrent protection as claimed in claim 16, further comprising generating a trip signal when the composite signal exceeds the threshold, to isolate the load from the power.

18. The method as claimed in claim 16 wherein:
the sensed load current is an instantaneous current passing through the load;
the sensed voltage across the switching device is an instantaneous voltage across the switching device;
the summing step comprises summing a signal representative of the instantaneous voltage across the switching device with a signal representative of the instantaneous current flowing through the load to obtain a composite signal; and
the threshold is a reference voltage.

19. The method as claimed in claim 18 further comprising generating a cut out signal when the composite signal exceeds the reference voltage.

20. The method as claimed in claim 19 wherein the voltage across the switching device is sensed using a voltage sense resistor R1 in series with a voltage converter resistor R2.

21. The method as claimed in claim 20 wherein the instantaneous current passing through the load is sensed using a current sense resistor RS1 in series with the load.

22. The method as claimed in claim 21 wherein the composite signal VA is determined according to the relation:

$$VA=R2\cdot V_{LL}/(R1+R2)+VRS1$$

Where:
$V_{LL}$=Line voltage−Load voltage
R1=Voltage sense resistor resistance
R2=Voltage converter resistor resistance
VRS1=Current sense resistor voltage.

23. A method for providing overcurrent protection as claimed in claim 21 wherein when the overcurrent condition is detected the load current $I_T$ passing through the current sense resistor RS1 exceeds:

$$[V_{ref}-R2\cdot V_{LL}/(R1+R2)]/RS1$$

Where:
$V_{LL}$=Line voltage−Load voltage
R1=Voltage sense resistor resistance
R2=Voltage converter resistor resistance
RS1=Current sense resistor resistance
$V_{ref}$=reference voltage.

* * * * *